United States Patent
Jung et al.

(10) Patent No.: US 8,611,902 B2
(45) Date of Patent: Dec. 17, 2013

(54) METHOD IN WHICH A MOBILE STATION RECEIVES INFORMATION ON A PERIPHERAL LEGACY BASE STATION IN A LEGACY SUPPORT MODE

(75) Inventors: In Uk Jung, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/384,220

(22) PCT Filed: Jul. 14, 2010

(86) PCT No.: PCT/KR2010/004579
§ 371 (c)(1),
(2), (4) Date: Jan. 13, 2012

(87) PCT Pub. No.: WO2011/008021
PCT Pub. Date: Jan. 20, 2011

(65) Prior Publication Data
US 2012/0115482 A1 May 10, 2012

Related U.S. Application Data

(60) Provisional application No. 61/225,551, filed on Jul. 14, 2009.

(30) Foreign Application Priority Data

Jul. 14, 2010 (KR) .......... 10-2010-0067812

(51) Int. Cl.
*H04W 36/00* (2009.01)
(52) U.S. Cl.
USPC ..... 455/436; 455/442; 455/432.1; 455/435.1; 455/422.1; 370/331

(58) Field of Classification Search
USPC ............... 455/436, 442, 432.1, 435.1, 422.1; 370/331
See application file for complete search history.

(56) References Cited

U.S. PATENT DOCUMENTS

2006/0030309 A1   2/2006  Lee et al.
2012/0287884 A1*  11/2012  Jung et al. .......... 370/329

FOREIGN PATENT DOCUMENTS

WO  2006/107701  10/2006
WO  2007/078043  7/2007

OTHER PUBLICATIONS

Intel, "Text Proposal for 16m HO Procedure (AWD-152.6)", IEEE 802.16 Broadband Wireless Access Working Group, IEEE C802.16m-09/1642, Jul. 2009.

*Primary Examiner* — Nghi H Ly
(74) *Attorney, Agent, or Firm* — Lee, Hong, Degerman, Kang & Waimey

(57) ABSTRACT

The present invention relates to a broadband wireless access system, and more particularly, to a method and an apparatus for acquiring system information in a mobile communication system in which a legacy system and an advanced system coexist. A method of receiving system information on a peripheral base station in a mobile communication system includes receiving a second message containing time information for receiving, through a second region of a serving base station, a first message broadcasted through a first region of the serving base station and receiving the first message through the first region of the serving base station using the time information, the first message containing system information on neighbor legacy base stations and/or on the first region of neighbor advanced base stations which operate in a mixed mode.

20 Claims, 5 Drawing Sheets

METHOD IN WHICH A MOBILE STATION RECEIVES INFORMATION ON A PERIPHERAL LEGACY BASE STATION IN A LEGACY SUPPORT MODE

CROSS-REFERENCE TO RELATED APPLICATIONS

This application is the National Stage filing under 35 U.S.C. 371 of International Application No. PCT/KR2010/004579, filed on Jul. 14, 2010, which claims the benefit of earlier filing date and right of priority to Korean Application No. 10-2010-0067812, filed on Jul. 14, 2010, and also claims the benefit of U.S. Provisional Application Ser. No. 61/225, 551, filed on Jul. 14, 2009, the contents of which are all incorporated by reference herein in their entirety.

TECHNICAL FIELD

The present invention relates to a broadband wireless access system and more particularly to a method for an advanced mobile station to efficiently acquire neighbor legacy BS information in a mobile communication system in which a legacy system and an advanced system are present together.

BACKGROUND ART

Handover (HO) is a procedure in which a mobile station (MS) moves from an air interface of one base station to an air interface of another base station. A handover procedure of a general IEEE 802.16e system is described below.

In an IEEE 802.16e network, a serving base station (SBS) may broadcast neighbor base station information through a neighbor advertisement (MOB_NBR-ADV) message in order to inform a mobile station (MS) of basic network configuration information (topology).

The MOB_NBR-ADV message includes system information of a serving base station and neighbor base stations, for example, preamble indexes, frequencies, handover (HO) optimization possibility, downlink channel descriptor (DCD)/uplink channel descriptor (UCD) information, etc.

The DCD/UCD information includes information required for an MS to perform information exchange in downlink and uplink. For example, the DCD/UCD information includes HO trigger information, a medium access control (MAC) version of a base station, Media Independent Handover (MIH) capability information, etc.

A general MOB_NBR-ADV message includes only information associated with neighbor base stations of an IEEE 802.16e type. Information associated with base stations of the type other than an IEEE 802.16e type may be broadcast to MSs through a service identity information advertisement (SII-ADV) message. Accordingly, an MS may acquire information associated with base stations of a heterogeneous network by requesting an SBS to transmit the SII-ADV message.

A procedure for performing handover by an MS, which has acquired information associated with neighbor base stations using the above-described method, in an IEEE 802.16e network is described below in more detail.

The general handover procedure in an IEEE 802.16e network may include HO initiation and preparation, HO execution, and HO completion.

An example of a basic handover procedure configured as described above is described below with reference to FIG. 1.

FIG. 1 illustrates an example of a handover procedure which may be performed in an IEEE 802.16e system.

As shown in FIG. 1, first, a mobile station (MS) may access a serving base station (SBS) to perform data exchange (S101).

The SBS may periodically broadcast information associated with neighbor base stations (BSs) located within the coverage of the SBS to the MS through an MOB_NBR-ADV message (S102).

The MS may begin to scan candidate HO BSs using an HO trigger condition while communicating with the SBS. The MS may transmit a handover request (MOB_MSHO-REQ) message to request the SBS to perform a handover procedure when a handover condition is satisfied, for example, when a predetermined hysteresis margin value is exceeded (S103).

The SBS may inform candidate HO BSs included in the MOB_MSHO-REQ message of the handover request received from the MS through an HO-REQ message (S104).

The candidate HO BSs may take precautions for the MS which has requested handover and transmit information associated with handover to the SBS through an HO-RSP message (S105).

The SBS may transmit the information associated with handover acquired from the candidate HO BSs through the HO-RSP message to the MS through a handover response (MOB_BSHO-RSP) message. The MOB_BSHO-RSP message may include information required to perform handover such as an action time for handover, a handover identifier (HO ID) and a dedicated HO CDMA ranging code (S106).

The MS may determine one target BS among the candidate HO BSs based on information included in the MOB_BSHO-RSP message received from the SBS. Then, the MS may attempt to perform ranging by transmitting a CDMA code to the determined target BS (S107).

The target BS which has received the CDMA code may transmit information indicating whether or not ranging has succeeded and physical correction values to the MS through a ranging response (RNG-RSP) message (S108).

Then, the MS may transmit a ranging request (RNG-REQ) message for authentication to the target BS (S109).

The target BS which has received the ranging request message of the MS may provide system information such as a connection identifier (CID) which can be used in the BS to the MS through a ranging response message (S110).

When the target BS has successfully completed authentication of the MS and has transmitted all update information, the target BS may notify the SBS of the MS of whether or not handover has succeeded through a handover completion message (HO-CMPT) (S111).

Thereafter, the MS may exchange information with the target BS which performs handover (S112).

The above description has been given assuming that the handover process is performed between the MS and the BS which follow the IEEE 802.16e standard (WirelessMAN-OFDMA Reference System). Hereinafter, in the present specification, a system to which a general technology including the IEEE 802.16e standard is applied is referred to as a "legacy system" for ease of explanation. An MS to which the legacy technology is applied is referred to as a "Yardstick MS (YMS)" or "legacy MS" and a BS to which the legacy technology is applied is referred to as a "Yardstick BS (YBS)" or a legacy BS".

A system to which an advanced technology including the IEEE 802.16m standard (WirelessMAN-OFDMA Advanced System) is applied is referred to as an "advanced system". An MS to which the advanced technology is applied is referred to as an "advanced MS (AMS)", and a BS to which the advanced technology is applied is referred to as an "advanced BS (ABS)".

The YBS has only a legacy zone (L zone or LZone) having a physical channel frame structure applied to a legacy system and the ABS may support only the AMS or both the AMS and the YMS. When the ABS supports only the AMS (WirelessMAN-OFDMA advanced system only), the ABS has only an advanced MS support zone (M zone or MZone) having a physical channel frame structure applied to an advanced system. When the ABS supports both the AMS and the YMS (WirelessMAN-OFDMA Reference System/WirelessMAN-OFDMA Advanced co-existing System legacy support), the ABS may operate in a mixed mode. In the following, the mixed mode operation is described with reference to the case in which the legacy system is an IEEE 802.16e system and the advanced system is an IEEE 802.16m system. When the ABS operates in the mixed mode, the ABS has both the legacy zone (LZone) and the advanced MS support zone (MZone). In the mixed mode, the uplink (UL) zone may be divided into an L zone and an M zone through Time Division Multiplexing (TDM) or Frequency Division Multiplexing (FDM).

The AMS may receive services from both the ABS and the YBS. That is, the AMS may receive a service through any one of the advanced MS support zone and the legacy zone and may perform both a handover procedure defined in the legacy system and a handover procedure defined in the advanced system. The mixed mode operation is described below assuming that the legacy system is an IEEE 802.16e system and the advanced system is an IEEE 802.16m system as mentioned above.

While the AMS receives a service from an M zone of an ABS that supports both the AMS and the YMS, the AMS may need to be handed over to the legacy system or to an L zone of another ABS. In this case, the AMS may perform network reentry to a target BS (a YBS or an L zone of an ABS that operates in the mixed mode) according to a network reentry procedure defined in the legacy system. However, before performing network reentry, the AMS may need to acquire information associated with neighbor legacy BSs or neighbor BSs that support the legacy system.

DISCLOSURE

Technical Problem

An object of the present invention devised to solve problems of the related art described above lies in providing a method for an advanced MS to efficiently acquire system information of a neighbor legacy BS.

Objects of the present invention are not limited to those described above and other objects will be clearly understood by those skilled in the art from the following description.

Technical Solution

In accordance with one embodiment of the present invention to achieve the above objects, a method for a mobile station to receive neighbor base station information from a serving base station that operates in a mixed mode in a mobile communication system in which a legacy system and an advanced system are present together may include receiving a second message including time point information for receiving a first message through a first zone of the serving base station through a second zone of the serving base station, and receiving the first message through the first zone of the serving base station using the time point information. Here, the first message may include system information of at least one of a neighbor base station of the serving base station, the neighbor base station supporting only the legacy system, and the first zone of a neighbor base station of the serving base station, the neighbor base station operating in the mixed mode.

In accordance with another embodiment of the present invention to achieve the above objects, a mobile station for receiving neighbor base station information from a serving base station that operates in a mixed mode in a mobile communication system in which a legacy system and an advanced system are present together may include a processor, and a Radio Frequency (RF) module for transmitting and receiving a wireless signal to and from the base station under control of the processor. Here, when the processor has received, from a second zone of the serving base station, a second message including time point information indicating a time point for receiving a first message that is broadcast through a first zone of the serving base station, the processor may perform a control operation for receiving the first message through the first zone of the serving base station using the time point information, and the first message may include system information of at least one of a neighbor base station of the serving base station, the neighbor base station supporting only the legacy system, and the first zone of a neighbor base station of the serving base station, the neighbor base station operating in the mixed mode.

In the above embodiments, the time point information may include at least one of offset information representing a time point at which the first message is broadcast from the first zone using an offset from a time point at which the second message is received, and interval information indicating a period, at intervals of which the first message is broadcast from the first zone.

Here, preferably, the offset information and the interval information are determined on a frame by frame basis.

Preferably, the legacy system may be, but is not limited to, a WirelessMAN-OFDMA system and the advanced system is an IEEE 802.16m system.

In addition, preferably, the first zone is an L zone (LZone) that supports the legacy system and the second zone is an M zone (Mzone) that supports the advanced system.

Further, preferably, the first message is a neighbor advertisement (MOB_NBR-ADV) message and the second message is an advanced neighbor advertisement (AAI_NBR-ADV) message.

Advantageous Effects

The mobile station may efficiently acquire neighbor legacy base station information from an L zone of a base station by acquiring, through a message broadcast from an M zone of the base station, information required to receive a message including the neighbor legacy base station information that is broadcast from the L zone of the base station.

Advantages of the present invention are not limited to those described above and other advantages will be clearly understood by those skilled in the art from the following description.

BEST MODE

Figure 1:
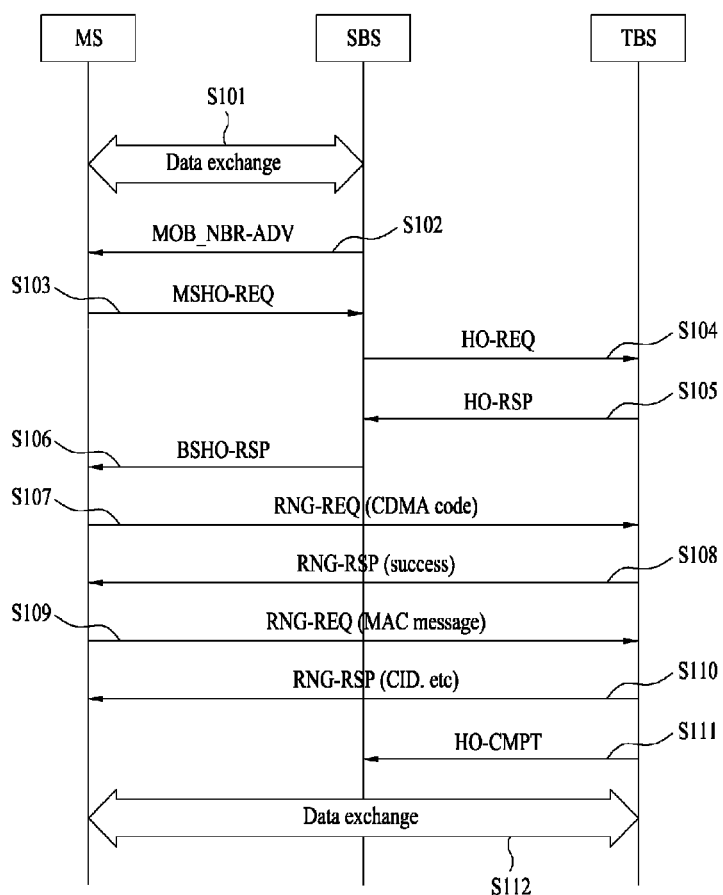
FIG. 1 illustrates an example of a handover procedure which may be performed in an IEEE 802.16e system.

The embodiments described below are provided by combining components and features of the present invention in specific forms. The components or features of the present invention can be considered optional unless explicitly stated otherwise. The components or features may be implemented without being combined with other components or features. The embodiments of the present invention may also be provided by combining some of the components and/or features. The order of the operations described below in the embodiments of the present invention may be changed. Some components or features of one embodiment may be included in another embodiment or may be replaced with corresponding components or features of another embodiment.

The embodiments of the present invention have been described focusing mainly on the data communication relationship between a terminal and a Base Station (BS). The BS is a terminal node in a network which performs communication directly with the terminal. Specific operations which have been described as being performed by the BS may also be performed by an upper node as needed.

That is, it will be apparent to those skilled in the art that the BS or any other network node may perform various operations for communication with terminals in a network including a number of network nodes including BSs. The term "base station (BS)" may be replaced with another term such as "fixed station", "Node B", "eNode B (eNB)", "access point", or "Advanced BS (ABS)". In addition, the term "terminal" may also be replaced with another term such as "User Equipment (UE)", Mobile Station (MS)", "Mobile Subscriber Station (MSS)", "Advanced MS (AMS)", or "Subscriber Station (SS)".

The embodiments of the present invention may be implemented by various means. For example, the embodiments of the present invention may be implemented by hardware, firmware, software, or any combination thereof.

In the case in which the present invention is implemented by hardware, the methods according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

In the case in which the present invention is implemented by firmware or software, the methods according to the embodiments of the present invention may be implemented in the form of modules, processes, functions, or the like which perform the features or operations described below. Software code can be stored in a memory unit so as to be executed by a processor. The memory unit may be located inside or outside the processor and can communicate data with the processor through a variety of known means.

The embodiments of the present invention can be supported by standard documents of at least one of the IEEE 802 system, the 3GPP system, the 3GPP LTE system, and the 3GPP2 system which are wireless access systems. That is, steps or portions that are not described in the embodiments of the present invention for the sake of clearly describing the spirit of the present invention can be supported by the standard documents. For all terms used in this disclosure, reference can be made to the standard documents. Especially, the embodiments of the present invention can be supported by one or more of P802.16-2004, P802.16e-2005, P802.16Rev2, and IEEE P802.16m which are standard documents of the IEEE 802.16 system.

Specific terms used in the following description are provided for better understanding of the present invention and can be replaced with other terms without departing from the spirit of the present invention.

First Embodiment

In the following description, it is assumed that an AMS is receiving a service from an M zone of an ABS that operates in a mixed mode and the AMS needs neighbor legacy BS information in order to perform, for example, handover to a neighbor legacy BS.

System information of neighbor legacy BSs is included in a neighbor advertisement (MOB_NBR-ADV) message that is broadcast from an L zone of the ABS that operates in a mixed mode. However, to receive the MOB_NBR-ADV message broadcast from the L zone, the AMS first needs to acquire system information of the L zone (i.e., DCD/UCD information). That is, the MOB_NBR-ADV message includes both system information of the BS and system information of other neighbor BSs (i.e., delta information) and thus the AMS needs to acquire system information of the L zone in order to receive the MOB_NBR-ADV message.

If the AMS does not know when the MOB_NBR-ADV message of the L zone is transmitted, a significant delay time, which corresponds to a MOB_NBR-ADV message transmission period in the worst case, may occur since the MOB_NBR-ADV message of the L zone is broadcast at intervals of a relatively long period even when the AMS has already acquired system information of the L zone through a different method, for example, through a message directly received from the L zone or a message transmitted from the M zone.

Accordingly, an embodiment of the present invention suggests a method for notifying, in the M zone, an AMS of when the neighbor advertisement message is transmitted or of both when the neighbor advertisement message is transmitted and when system information of the L zone is transmitted.

Information indicating when the system information of the L zone is transmitted and when the neighbor advertisement message is transmitted may be transmitted through a message that is transmitted to the AMS from the M zone. An example of this message includes an advanced neighbor advertisement (AAI_NBR-ADV) message of the M zone.

That is, the AAI_NBR-ADV message is generally used for an ABS to transmit neighbor BS information. This embodiment suggests that information as to when the system information of the L zone is transmitted and information as to when the neighbor advertisement message of the L zone is transmitted be included in the AAI_NBR-ADV message.

In one method for an AMS to determine whether or not a legacy BS or an ABS which operates in the mixed mode (i.e., an L zone of an ABS) is present around the AMS, the AMS may determine that a legacy BS or an L zone of an ABS is present around the AMS if information as to when a neighbor advertisement message is transmitted is included in an AAI_NBR-ADV message. Alternatively, a field (for example, a greenzone indicator) indicating whether or not a neighbor legacy BS is present may be included in the AAI_NBR-ADV message and the AMS may determine whether or not a neighbor legacy BS or an L zone of ABS is present through the field.

Information as to when the neighbor advertisement message of the L zone is transmitted, which will also be referred to as a reference pointer for ease of explanation, may include offset information and interval information.

The offset information indicates an offset from the time when a message (for example, an AAI_NBR-ADV message) including the reference pointer is transmitted to the time when the MOB_NBR-ADV message of the L zone is transmitted. Preferably, the offset information is set on a frame by frame basis.

The interval information indicates a period, at intervals of which the MOB_NBR-ADV message is transmitted from the L zone. Preferably, the interval information is also set on a frame by frame basis.

Accordingly, once the AMS has acquired the offset information and the interval information, the AMS can receive a MOB_NBR-ADV message of the L zone at the time indicated by the offset information. The AMS can also receive the MOB_NBR-ADV message in a next period indicated by the interval information when the AMS has failed to receive the message at the time indicated by the offset information.

The above procedure is described below in more detail with reference to FIG. 2.

Figure 2:
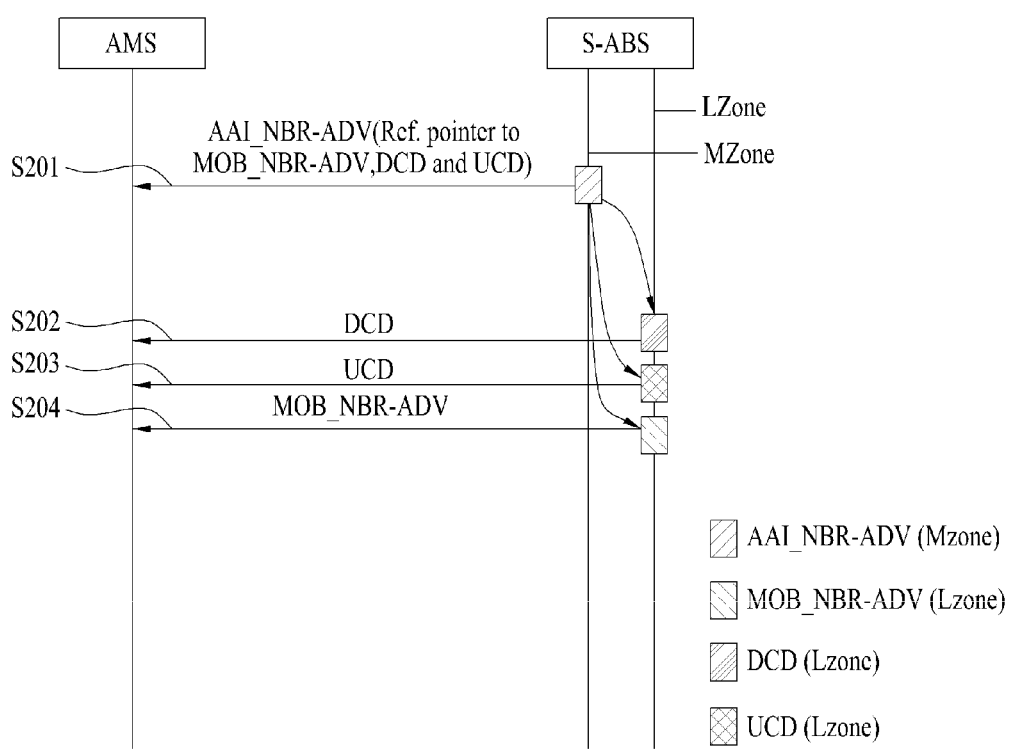
FIG. 2 illustrates an example of a procedure for an AMS to acquire neighbor legacy BS information according to an embodiment of the present invention.

FIG. 2 illustrates an example of a procedure for an AMS to acquire neighbor legacy BS information according to an embodiment of the present invention.

In the example of FIG. 2, it is assumed that a serving ABS operates in the mixed mode and the AMS is receiving a service from an M zone of the serving ABS.

As shown in FIG. 2, first, the AMS may acquire information as to when system information (UCD/DCD information) of the L zone is transmitted and information as to when an MOB_NBR-ADV message is transmitted through an AAI_NBR-ADV message received from the M zone of the serving ABS (S201).

Then, the AMS may receive a DCD/UCD of the L zone through the L zone using the time information acquired through the AAI_NBR-ADV message (S202, S203).

Then, the AMS may receive a MOB_NBR-ADV message through the L zone using the information as to the MOB_NBR-ADV message transmission time (S204).

Using the above method, the AMS can efficiently acquire system information of the L zone of the ABS or neighbor legacy BSs without an unnecessary delay time.

According to another aspect of this embodiment, the information as to when the DCD/UCD information of the L zone is transmitted may be omitted in the AAI_NBR-ADV message in the case where the AMS has already acquired DCD/UCD information of the L zone.

According to another aspect of this embodiment, the AMS may acquire DCD/UCD information, which is included in a frame indicated by the information as to when the MOB_NBR-ADV message is transmitted, from the L zone.

Second Embodiment

According to another embodiment of the present invention, the AMS may acquire UCD/DCD information of the L zone through the M zone. That is, the reference pointer information of the MOB_NBR-ADV message may still be included in the AAI_NBR-ADV message and DCD/UCD information, instead of information as to when the DCD/UCD information is transmitted from the L zone, may be included in the AAI_NBR-ADV message. This method is described below with reference to FIG. 3.

Figure 3:
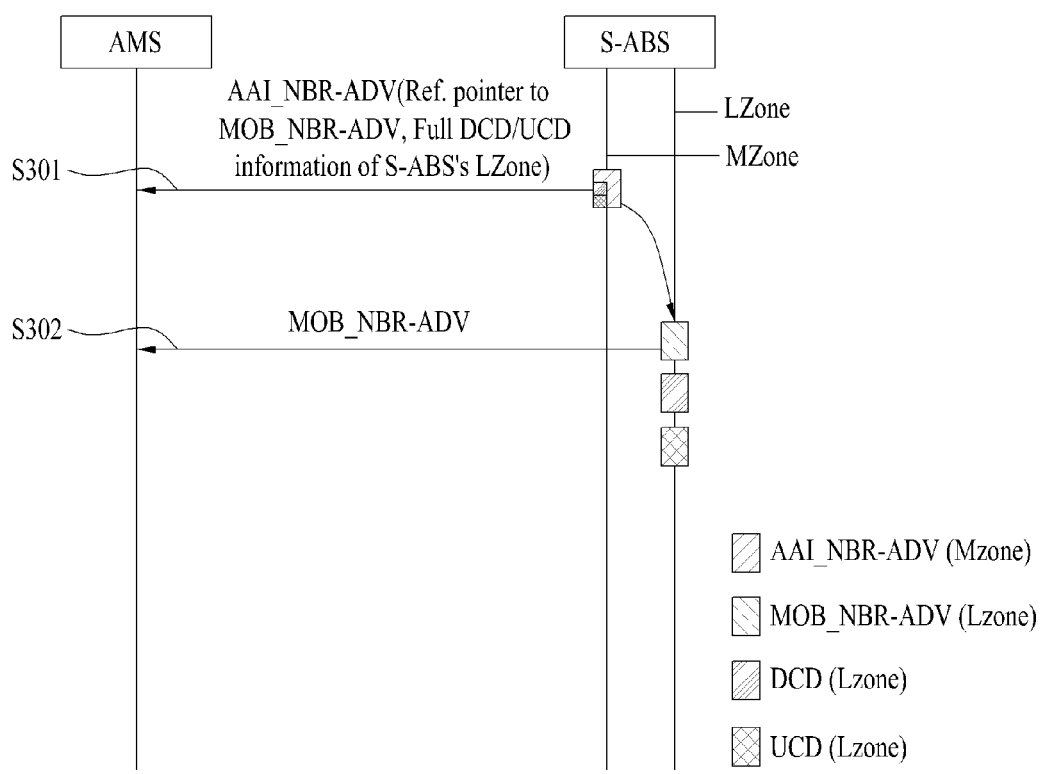
FIG. 3 illustrates an example of a procedure for an AMS to acquire neighbor legacy BS information according to another embodiment of the present invention.

FIG. 3 illustrates an example of a procedure for an AMS to acquire neighbor legacy BS information according to another embodiment of the present invention.

In the example of FIG. 3, it is assumed that the serving ABS operates in the mixed mode and the AMS is receiving a service from the M zone of the serving ABS.

As shown in FIG. 3, first, the AMS may acquire information as to when system information (full UCD/DCD information) of the L zone is transmitted and information as to when an MOB_NBR-ADV message is transmitted through an AAI_NBR-ADV message received from the M zone of the serving ABS (S301).

Since the AMS has already acquired the DCD/UCD information, the AMS may receive the MOB_NBR-ADV message through the L zone using the information as to when the MOB_NBR-ADV message of the L zone is transmitted (S302).

Third Embodiment

According to another embodiment of the present invention, delta information among information included in the MOB_NBR-ADV message (i.e., information different from the system information of the L zone from among the system information of neighbor BSs) and information as to when DCD/UCD information is transmitted from the L zone may be included in the AAI_NBR-ADV message. That is, this embodiment has the same effects as when the AMS receives the MOB_NBR-ADV message through the M zone. This method is described below with reference to FIG. 4.

Figure 4:
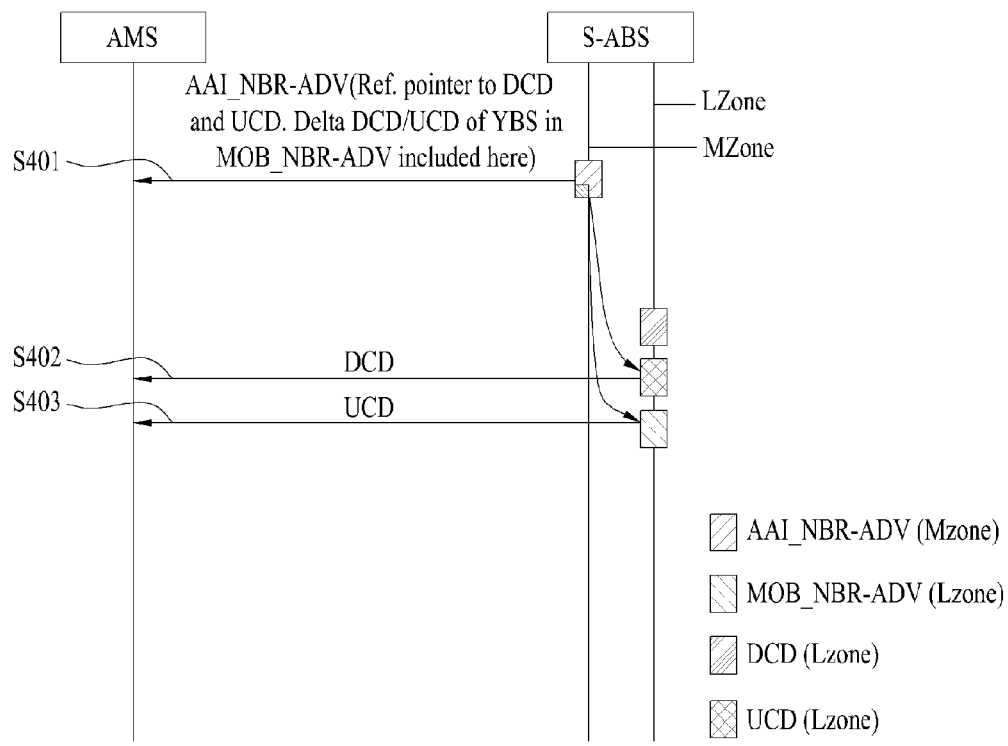
FIG. 4 illustrates an example of a procedure for an AMS to acquire neighbor legacy BS information according to another embodiment of the present invention.

FIG. 4 illustrates an example of a procedure for an AMS to acquire neighbor legacy BS information according to another embodiment of the present invention.

In the example of FIG. 4, it is assumed that the serving ABS operates in the mixed mode and the AMS is receiving a service from the M zone of the serving ABS.

As shown in FIG. 4, first, the AMS may acquire information as to when system information (UCD/DCD information) of the L zone is transmitted and delta information of an MOB_NBR-ADV message through an AAI_NBR-ADV message received from the M zone of the serving ABS (S401).

Since the AMS has already acquired the delta information, which can be acquired through the MOB_NBR-ADV message of the L zone, through the AAI_NBR-ADV message, the AMS may receive the DCD/UCD information from the L zone using the information as to when the system information (UCD/DCD information) of the L zone is transmitted (S402, S403).

Using the above method, the AMS can efficiently acquire system information of neighbor legacy BSs.

According to another aspect of this embodiment, the information as to when the DCD/UCD information of the L zone is transmitted may be omitted in the AAI_NBR-ADV message in the case where the AMS has already acquired DCD/UCD information of the L zone.

In the above embodiments, the AMS may acquire information regarding neighbor legacy BS or information regarding the L zone of the ABS and may perform scanning and/or handover to a neighbor legacy BS or to the L zone of the ABS using the acquired information.

AMS and ABS Structure

An AMS and an ABS (FBS or MBS) according to another embodiment of the present invention in which the embodiments of the present invention can be performed are described below.

The AMS may operate as a transmitter in uplink and may operate as a receiver in downlink. The ABS may operate as a receiver in uplink and may operate as a transmitter in downlink. That is, each of the AMS and the ABS may include a transmitter and a receiver for information or data transmission.

The transmitter and the receiver may include a processor, a module, a portion, and/or a means for performing the embodiments of the present invention. Specifically, each of the transmitter and the receiver may include a module (means) for encrypting a message, a module for parsing an encrypted message, an antenna for transmitting and receiving a message, and the like. An example of such transmitting and receiving ends is described below with reference to FIG. 5.

Figure 5:
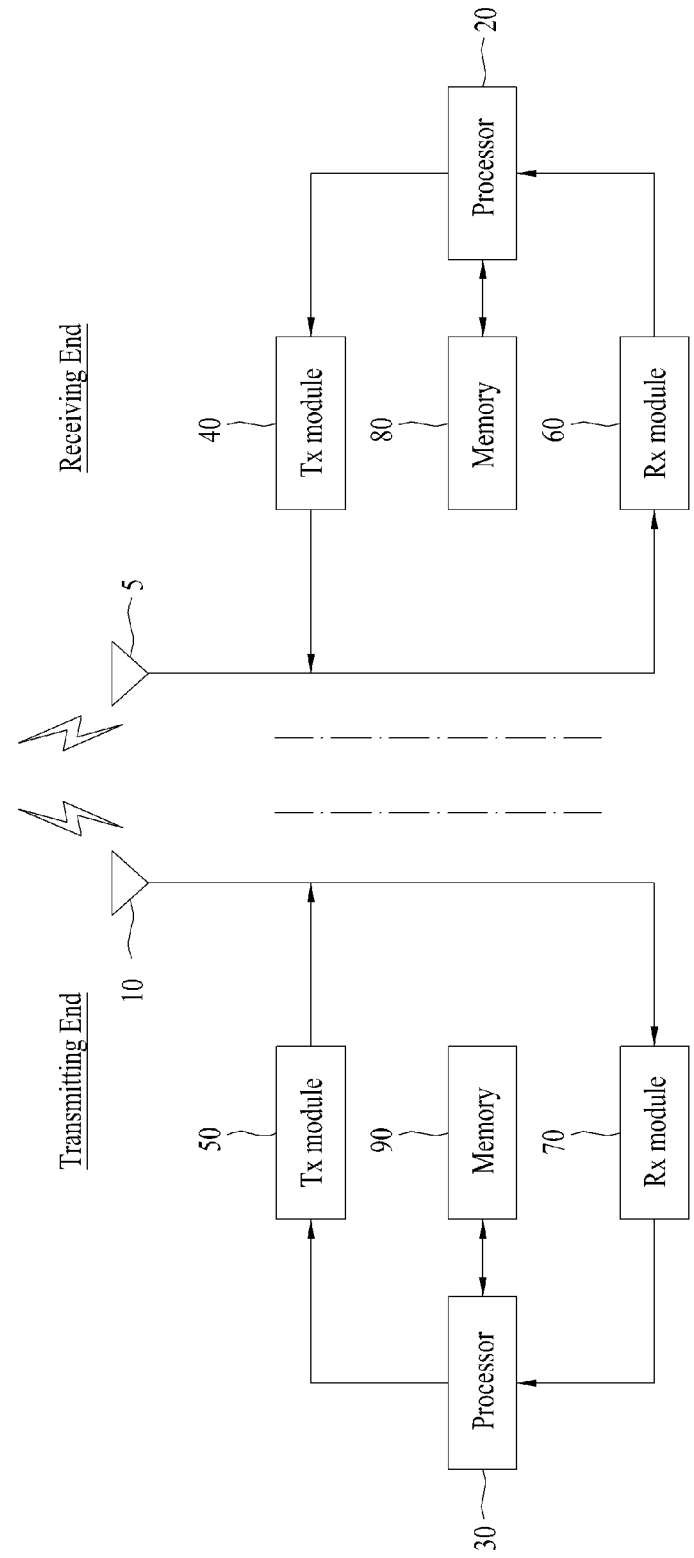
FIG. 5 is a block diagram illustrating exemplary structures of a transmitting end and a receiving end according to another embodiment of the present invention.

FIG. 5 is a block diagram illustrating exemplary structures of the transmitting end and the receiving end according to another embodiment of the present invention.

A left part of FIG. 5 illustrates the structure of the transmitting end and a right part of FIG. 5 illustrates the structure of the receiving end. The transmitting and receiving ends may include antennas 5 and 10, processors 20 and 30, transmission modules (Tx modules) 40 and 50, reception modules (Rx modules) 60 and 70, and memories 80 and 90, respectively. Each pair of components may perform a corresponding function. The following is a detailed description of each of the components.

The antennas 5 and 10 may function to transmit signals generated by the transmission modules 40 and 50 to the outside and to receive wireless signals from the outside and deliver the wireless signals to the reception modules 60 and 70. Each of the transmitting and receiving ends may include two or more antennas when a multiple antenna (MIMO) scheme is supported.

In each of the transmitting and receiving ends, the antenna, the transmission module, and the reception module may constitute a Radio Frequency (RF) module.

The processors 20 and 30 generally control overall operations of the AMS and the ABS, respectively. Specifically, each of the processors 920 and 930 may perform a control function for performing the embodiments of the present invention described above, a function to perform MAC frame variable control according to service characteristics and radio environments, a handover function, authentication and encryption functions, and the like.

The processor of the AMS may control operations of the AMS for performing a procedure for acquiring system information of the L zone of the ABS or a neighbor legacy BS using a method in which the AMS acquires information required to receive an MOB_NBR-ADV message, which is broadcast through an L zone of the ABS, through an M zone of the ABS that operates in the mixed mode and receives an MOB_NBR-ADV message of the L zone using the acquired information.

The processor of the AMS may also perform overall control of the operating procedures described in the above embodiments.

The transmission modules 40 and 50 may perform coding and modulation of data, which has been scheduled by the processors to be transmitted to the outside, and then may deliver the resulting data to the antennas 5 and 10, respectively.

The reception modules 60 and 70 may perform decoding and demodulation upon radio signals received from the outside through the antennas 5 and 10 to restore the radio signals into original data and then may deliver the original data to the processors 20 and 30, respectively.

The memories 80 and 90 may store programs for processing and control by the processors and may also temporarily store input/output data items. The memories 80 and 90 may include a storage medium of at least one of a flash memory type, a hard disk type, a multimedia card micro type, a card type (for example, SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), a magnetic memory, a magnetic disc, and an optical disc.

The ABS may perform, through at least one of the modules described above, a control function for performing the embodiments of the present invention described above, Orthogonal Frequency Division Multiple Access (OFDMA) packet scheduling, Time Division Duplex (TDD) packet scheduling, and channel multiplexing functions, a function to perform MAC frame variable control according to service characteristics and radio environments, a high-speed traffic real-time control function, a handover function, authentication and encryption functions, a function to perform modulation/demodulation for data transmission, a high-speed packet channel coding function, a real-time modem control function, and the like or may further include means, modules, or portions for performing these functions.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be embraced within the scope of the invention. In addition, claims which are not explicitly dependent on each other can be combined to provide an embodiment or new claims can be added through amendment after this application is filed.

INDUSTRIAL APPLICABILITY

Although a method for acquiring legacy BS information and an MS structure for the same in a broadband wireless access system have been described with reference to an example in which the method and the MS structure are applied to an IEEE 802.16m system, the method and the MS structure may also be applied to various other mobile communication systems having femto BSs.

The invention claimed is:

1. A method for a mobile station to receive neighbor base station information from a serving base station in a wireless access system, the method comprising:
receiving a second message including first time point information indicating a time point at which a first message is broadcast from a first zone of the serving base station through a second zone of the serving base station;
receiving the first message from the first zone of the serving base station using the first time point information, wherein the first message including system information of at least a neighbor legacy base station which supports only a legacy system or the first zone of a neighbor advanced base station which operates in a mixed mode; and performing handover to one of the at least neighbor legacy base station or the first zone of the neighbor advanced base station by using the system information included in the first message.

2. The method according to claim 1, wherein the first time point information includes at least:
   offset information representing a time point at which the first message is broadcast from the first zone using an offset from a time point at which the second message is received; or
   interval information indicating a period, at intervals of which the first message is broadcast from the first zone.

3. The method according to claim 2, wherein the offset information and the interval information are determined on a frame unit basis.

4. The method according to claim 3, further comprising receiving the system information of the first zone in a frame indicated by the first time point information.

5. The method according to claim 3, wherein:
   the first message further includes second time point information indicating a time point at which the system information of the first zone is transmitted, and
   the method further comprises receiving the system information of the first zone using the second time point information.

6. The method according to claim 1, wherein the first zone is an L zone (LZone) that supports the legacy system and the second zone is an M zone (Mzone) that supports an advanced system.

7. The method according to claim 1, wherein the first message is a neighbor advertisement (MOB_NBR-ADV) message and the second message is an advanced neighbor advertisement (AAI_NBR-ADV) message.

8. A mobile station for receiving neighbor base station information from a serving base station in a mobile communication system, the mobile station comprising:
   a processor; and
   a Radio Frequency (RF) module for transmitting and receiving a wireless signal to and from the serving base station under control of the processor,
   wherein, when a second message, including time point information indicating a time point for receiving a first message that is broadcast through a first zone of the serving base station, is received from a second zone of the serving base station, the processor performs a control operation for receiving the first message through the first zone of the serving base station using the time point information,
   wherein the first message includes system information of at least a neighbor legacy base station which supports only a legacy system or the first zone of a neighbor advanced base station which operates in a mixed mode, and
   wherein the processor performs handover to one of the at least neighbor legacy base station or the first zone of the neighbor advanced base station by using the system information included in the first message.

9. The mobile station according to claim 8, wherein the time point information includes at least:
   offset information representing a time point at which the first message is broadcast from the first zone using an offset from a time point at which the second message is received; or
   interval information indicating a period, at intervals of which the first message is broadcast from the first zone.

10. The mobile station according to claim 9, wherein the offset information and the interval information are determined on a frame unit basis.

11. The mobile station according to claim 10, wherein the processor performs a control operation for receiving the system information of the first zone in a frame indicated by the time point information.

12. The mobile station according to claim 10, wherein:
    the first message further includes second time point information indicating a time point at which the system information of the first zone is transmitted, and
    the processor performs a control operation for receiving the system information of the first zone using the second time point information.

13. The mobile station according to claim 8, wherein the first zone is an L zone (LZone) that supports the legacy system and the second zone is an M zone (Mzone) that supports an advanced system.

14. The mobile station according to claim 13, wherein the first message is a neighbor advertisement (MOB_NBR-ADV) message and the second message is an advanced neighbor advertisement (AAI_NBR-ADV) message.

15. A method for a base station that operates in a mixed mode to transmit neighbor base station information in a wireless access system, the method comprising:
    broadcasting a second message including first time point information indicating a time point at which a first message is broadcast from a first zone of the base station through a second zone of the base station; and
    broadcasting the first message from the first zone of the base station according to the first time point information,
    wherein the first message includes system information of at least a neighbor legacy base station which supports only a legacy system or the first zone of a neighbor advanced base station which operates in the mixed mode.

16. The method according to claim 15, wherein the first time point information includes at least:
    offset information representing a time point at which the first message is broadcast from the first zone using an offset from a time point at which the second message is received; or
    interval information indicating a period, at intervals of which the first message is broadcast from the first zone.

17. The method according to claim 16, wherein the offset information and the interval information are determined on a frame unit basis.

18. The method according to claim 17, further comprising broadcasting the system information of the first zone in a frame indicated by the first time point information.

19. The method according to claim 17, wherein:
    the first message further includes second time point information indicating a time point at which the system information of the first zone is broadcast, and
    the method further comprises broadcasting the system information of the first zone according to the second time point information.

20. The method according to claim 15, wherein the first message is a neighbor advertisement (MOB_NBR-ADV) message and the second message is an advanced neighbor advertisement (AAI_NBR-ADV) message.

* * * * *